United States Patent [19]
Trigg et al.

[11] Patent Number: 5,855,841
[45] Date of Patent: *Jan. 5, 1999

[54] PROCESS FOR PRODUCING DENSE CERAMIC PRODUCT

[75] Inventors: Mark Brian Trigg, Ashburton; Chull Hee Oh, Knoxfield; Nick Rigopoulos, Brighton, all of Australia

[73] Assignee: Commonwealth Scientific and Industrial Research Organisation, Campbell, Australia

[ * ] Notice: The term of this patent shall not extend beyond the expiration date of Pat. No. 5,855,842.

[21] Appl. No.: 715,916

[22] Filed: Sep. 19, 1996

Related U.S. Application Data

[63] Continuation of Ser. No. 256,042, filed as PCT/AU92/00676 Dec. 23, 1992 published as WO93/13031 Jul. 8, 1993, abandoned.

[30] Foreign Application Priority Data

Dec. 23, 1991 [AU] Australia .................. PL0172

[51] Int. Cl.$^6$ .................................... C04B 37/00
[52] U.S. Cl. ........................ 264/654; 264/674; 264/682
[58] Field of Search ................... 264/625, 654, 264/674, 682

[56] References Cited

U.S. PATENT DOCUMENTS

| | | | |
|---|---|---|---|
| 4,564,490 | 1/1986 | Omori et al. | 264/65 |
| 4,569,921 | 2/1986 | Omori et al. | 501/88 |
| 4,829,027 | 5/1989 | Cutler et al. | 501/89 |

FOREIGN PATENT DOCUMENTS

| | | |
|---|---|---|
| 63095/90 | 9/1990 | Australia . |
| 1-76967 | 5/1989 | Japan . |
| 13240 K/06 | 11/1995 | Japan . |
| PCT/AU90/00518 | 10/1990 | WIPO . |

OTHER PUBLICATIONS

International Search Report, International Application No. PCT/AU92/00676.

*Primary Examiner*—Christopher A. Fiorilla
*Attorney, Agent, or Firm*—Merchant, Gould, Smith, Edell, Welter & Schmidt, P.A.

[57] ABSTRACT

A process for the production of dense polycrystalline silicon carbide shaped articles, includes the steps: (a) heating a powder compact containing silicon carbide and alumina or a precursor thereof together with a secondary sintering assist, to an intermediate temperature for an extended dwell, and then (b) heating the product of step (a) to a higher temperature for sufficient time to produce a dense polycrystalline silicon carbide product. The secondary sintering assist includes one or more rare earths or their precursors, for example scandia, yttria or dysprosia.

29 Claims, No Drawings

PROCESS FOR PRODUCING DENSE CERAMIC PRODUCT

This is a Continuation of application Ser. No. 08,256, 042, filed as PCT/AU92/00676 Dec. 23, 1992, published as WO93/13031 Jul. 8, 1993, now abandoned.

This invention relates to a process for the production of dense polycrystalline silicon carbide shaped articles and the superior shaped articles produced by the process. In one aspect the invention provides a new firing cycle for the production of dense polycrystalline silicon carbide shaped articles. In accordance with this firing cycle, powder compacts containing silicon carbide and alumina or a precursor thereof, together with a secondary sintering assist, are first heated to an intermediate temperature, as will be explained in more detail below. After an extended dwell at the intermediate temperature, the temperature is raised in the second stage in an atmosphere essentially of carbon monoxide to a higher temperature to complete the densification process.

The secondary sintering assist comprises at least one of scandium, yttrium, rare earths, zirconium, hafnium, thorium or their oxides or other precursors. Rare earths include the oxides of elements 57 to 71 (La, Ce, Pr, Nd, Pm, Sm, Eu, Gd, Tb, Dy, Ho, Er, Tm, Yb and Lu). Preferably secondary sintering assists are yttria, dysprosia, and ceria.

In a preferred embodiment of the invention, the first stage is carried out in an inert atmosphere such as argon, and the atmosphere is changed after the intermediate temperature dwell, for example by purging the furnace chamber and introducing carbon monoxide for the remainder of the firing cycle.

BACKGROUND OF THE INVENTION

Shaped articles comprising of polycrystalline silicon carbide are well known. They are characterised by excellent physical properties such as high resistance to thermal shock, abrasion and oxidation together with high levels of strength and thermal conductivity. It is this combination of properties which makes silicon carbide materials leading candidates for engineering applications. However, the production of satisfactory high density bodies is fraught with difficulties.

Early workers (eg Alliegro, Coffin and Tinkepaugh J. Amer. Ceram. Soc., 39 [11] 386–89 [1956]) showed that silicon carbide could be hot pressed to high density bodies with the aid of sintering aids such as aluminium and iron, and aluminium plus one of the metals zirconium, boron or iron. It was further disclosed that for the hot pressing of silicon carbide, magnesium additions and magnesium and aluminium additions were ineffective, and impaired the densification process as compared to a control sample of silicon carbide, hot pressed under identical conditions with no additives or additions. Lange (J. Mater. Sci.(10 [1975] 314–320) disclosed the hot pressing of silicon carbide using alumina as the densification aid. The limitations of hot pressing for the attainment of dense bodies are well known.

The selection of suitable densification aids for the sintering of silicon carbide has been considered by Negita (J. Am. Ceram. Soc. 69 [12]C308–10 [1986]). Using thermodynamic arguments it was found that metal additives such as boron, aluminium, iron, nickel and cobalt could be effective densification aids. Using these principles, alumina, beryllia, yttria, hafnia and rare earth oxides are considered to be potential densification aids as they do not decompose silicon carbide during sintering. Metal oxides including zirconia, calcia, magnesia are not considered suitable as they tend to decompose silicon carbide to metallic silicon. In addition the use of carbon with metal oxide additions was reported to be beneficial for oxides such as alumina, beryllia, yttria, rare earth oxides, calcia, zirconia, and hafnia. It is stated that the carbon is added to react with the said oxides to form the corresponding metal carbide and silicon metal. The formation of the metal carbides was seen as desirable. In the process according to the present invention, the formation of such metal carbides was not observed. Furthermore, in contrast to the work of Negita, in the current work it has been found that the reaction of carbon with the metal oxide densification aids is undesirable and impairs the densification of the bodies. This indicates that the role of carbon in the present work is different to that proposed by Negita and others. In addition, given the unstable nature of metal carbide phases, for some even in air at room temperature, the formation of such phases is seen as undesirable and are avoided in the present invention. This aspect will be discussed in greater detail for the calcia system.

The work of Cutler and Miller (U.S. Pat. No. 4,141,740) describes a process for a refractory product based on silicon carbide containing at least 1% by weight of aluminium nitride and at least 1% by weight aluminium oxycarbide. The presence of metal impurities (other than aluminium and silicon) were seen to be detrimental to the process and are limited to 0.1 percent by weight or less. No indication was given as to the properties of such bodies and the ease at which they can be made into dense bodies with desirable physical properties and the commercial utility of the process. Further work in this system was described by Virkar et al in International Patent application WO87/01693, where the pressureless sintering of silicon carbide-aluminium nitride-aluminium oxycarbide containing materials was described. A major drawback of the process as disclosed is that the materials must be heated at very rapid rates to minimise volatilisation of the active densification species. This could pose problems for the production of large parts in which differential sintering as a result of thermal gradients can lead to distortion and ultimately to micro cracking due to thermal stresses inevitably present as a result of the described firing cycles. This would make the maintenance of the desired physical properties difficult. In addition, the undesirable presence of aluminium oxycarbides in the final body may prove difficult to avoid.

According to Suzuki et al. (U.S. Pat. No. 4,354,991) the use of aluminium oxide to densify silicon carbide is described. In the process as described the use of non-oxidative atmospheres is taught. These include nitrogen, carbon monoxide, helium and argon. It is taught that argon or helium are preferable and that the atmosphere should preferably contain aluminium, silicon or carbon vapours in the atmosphere. In one method, it is proposed that mixtures of these gases be fed into the reaction chamber with a carrier gas such as nitrogen, argon and helium. In another method, the use of a powder bed, coating or sintered product capable of generating the gases around the silicon carbide article to be densified was disclosed. It was a teaching of the document that it is unnecessary to remove the silica present on the surface of the silicon carbide. In fact it was stated that it is feasible to add silica as a raw material. This is in contrast to the present invention where the presence of this phase has been found to exert a deleterious effect on the densification behaviour at high temperatures and will be explained below. These requirements are considered to be disadvantages of the process. The fired bulk densities obtained were inferior to those achieved compared to the results of this investigation. In addition, the sintering times were much longer. Thus the process and product as disclosed herein overcomes significant disadvantages of the process as disclosed by Suzuki.

In the work of Fuentes U.S. Pat. No. 4,876,226 the use of alumina and calcia as densification aids for silicon carbide was disclosed. It was a requirement of the invention to form liquid phases comprising aluminium oxycarbides at the sintering temperatures to promote densification. The addition of calcia was to increase the amount of the aluminium oxycarbide liquids and enhance densification. It was further disclosed that the addition of free carbon is preferred. It is believed that in the system described by Fuentes, the addition of free carbon is to react with aluminium containing phases to produce or further enhance the formation of the oxycarbide phases which are a requirement for the process. The level of free carbon additions were preferably greater than 0.4% by weight. No indication was given to an upper limit for the carbon addition. This is in contrast to the teachings of the present invention, where the reaction of carbon with the aluminate phase is believed to be detrimental to the densification process. It is claimed that the technique excludes the use of rare earths but no reference was given for their deletion. Indeed, in the work of Omori et al (U.S. Pat. No. 4,569,921) the use of calcia and precursors for the oxides of aluminium and rare earth elements for the pressureless sintering of silicon carbide was disclosed with excellent results. In addition, it was been reported by Foster et al (J. Am. Ceram. Soc. 39 [1] - 11 [1956]) that aluminium carbide and aluminium oxycarbide, the latter at least required for the process as outlined, are very unstable towards both moisture and oxygen. They thought that these materials should not be used in applications where these species are likely to be encountered. In the process as disclosed, such aluminium oxycarbide species are a key element of the process. The presence of such species is expected to greatly degrade the performance and severely limit the suitability of the said materials. In the present invention, aluminium oxycarbides, such as $Al_4O_4C$ and $Al_2OC$, have not been observed and their presence is not a prerequisite for the process disclosed herein. Thus the process and product as disclosed herein overcomes significant disadvantages of the process as disclosed by Fuentes.

The use of liquid phase sintering with the aid of alumina and rare earth additions has been disclosed by Cutler, Virkar and Hurford in U.S. Pat. No. 4,829,027. The advantages of this over the prior art are seen in the more rapid sintering rates as compared to the boron and carbon technology. It is claimed that the prior using rare earth oxides failed to take advantage of liquids in the rare earth oxide-alumina system (eg see U.S. Pat. Nos. 4,502,983; 4,564,490 and 4,569,921). These disclosures claimed that sintering rate of silicon carbide was enhanced by the presence of solid solutions of the silicon carbide and the additives in each other. In the work by Cutler et al, the use of vacuum or inert (argon, helium or nitrogen) atmospheres are disclosed for the sintering of silicon carbide. Although it is further disclosed that the use of nitrogen can be detrimental as a result of the formation of aluminium nitrides. It was further disclosed that rapid heating rates and short dwells at the maximum temperature are required to produce dense specimens. It should be appreciated that it is not always feasible to use short dwells. This is especially true when large furnace loads are used or when large components are being manufactured. Under these conditions large thermal gradients can exist within the load or within the bodies. This can lead to differential sintering and distortion of the bodies after processing. To overcome these problems slower heating rates are required. No indication of the weight loss of the samples was given.

The use of rare earths and alumina as sintering assists for silicon carbide has been disclosed (eg see Mulla and Krstic Bull. Amer. Ceram. Soc. 70 [3]439–443 [1991]). In order to obtain high density bodies, the components had to be encapsulated in closed, threaded graphite crucibles sealed with graphite foil. It was revealed that bodies could be produced with over 95% of theoretical density and weight losses of less than 1 percent. When the same experiments were carried out without encapsulation, the resulting bodies obtained less than 80 percent of theoretical density and weight losses up to 20 percent were recorded. Culter and Jackson (pp309–318 in Ceramics Materials and Components for Engines, Proceedings of the Third International Symposium, Las Vegas Nev. 1988) also disclosed the use of yttria and alumina for the sintering of silicon carbide. Although high density bodies could be produced, the recorded weight losses were high and increased with increasing temperature. The decomposition reactions between the sintering assists and the silicon carbide were cited as a major problem. As in the case of Mulla and Krstic only very short times were used, typically of 5 minutes duration at the maximum temperature. The requirement to subject samples to minimum times at high temperatures is considered difficult to carry out on a commercial scale especially for the manufacture of larger components or where large furnace loads are used can lead to large thermal gradients giving rise to problems such as but not limited to differential sintering, leading to distortion of the fired bodies. Thus the process and product as disclosed herein overcomes significant disadvantages of the process as disclosed.

DESCRIPTION OF THE INVENTION

This invention provides a dense silicon carbide product and a method of producing the same without the use of pressure assisted processes such as hot pressing or hot isostatic pressing, the use of boron or boron compounds and carbon, the use of powder beds, coatings or the requirement for sealed containers. It is an object of the present invention to overcome the difficulties of existing technologies and produce useful products based on silicon carbide. This is achieved by the addition of sintering assists, and providing an environment in terms of temperature and atmosphere that is conducive to densification. It is believed that the densification of the powder compacts is a result of a liquid phase sintering mechanism.

In the sintering of silicon carbide by techniques such as liquid phase sintering, it is believed that it is crucial to maintain the effective sintering aids within the body. In the temperature range at which densification occurs, these additives react to form a liquid phase into which silicon carbide has some degree of solubility. In the initial stages, the liquid which forms at high temperatures allows densification by particle rearrangement. This is usually followed by a solution precipitation step followed by a stage characterised by grain growth. If, as appears to be the case, it is the liquid phase that is facilitating the densification, the premature loss of sintering aids is to be avoided. The use of excessive amounts of sintering aids to compensate for the loss thereof is also to be avoided as this results in increased cost, and can also result in the deposition of unwanted species in the cooler parts of the furnace. In addition, the loss of sintering assists can result in compositional gradients. These species can be unstable with regard to the air and can result in damage to the furnace and make the manufacture of components hazardous. Thus, it is important in the efficient manufacture of components to minimise the loss of raw materials.

The use of powder beds in the manufacture of liquid phase sintered silicon carbide is known. The role of a powder bed is to provide a suitable environment. However, there are major drawbacks to the use of powder beds. These are:

Additional cost of the powder bed. Additional costs are associated with the increased number of handling operations such as loading and after the firing unloading the samples from the powder bed.

Poor surface finish especially where the samples are in prolonged contact with the powder bed.

The powder bed by providing active species for the densification can result in warping or distortion of the bodies as a result of gradients of densification aids therein, and densification gradients which can also lead to warping and distortion of the bodies.

Decomposition of components of the powder bed giving rise to deposits in cooler parts of the furnace, leading to degradation of the furnace linings and impaired operation of the furnace.

The use of sealed containers to encapsulate the bodies to avoid the loss of volatile constituents also imposes limitations for large scale production of bodies, as a result of additional costs associated with increased number of unit operations required to produce components, such as the requirement to load the samples into the sealed containers. The use of coatings is also disadvantageous as a result of the potential formation of compositional gradients within the fired body and the possible requirement for a machining operation to remove the surface layer or deposits as a consequence of the use of a coating.

A further advantage of the process is the use of secondary sintering assists with reduced vapour pressures of the metal at temperatures required for densification of the body compared to the alkaline earths. The minimisation of the loss of the sintering assist has already been discussed.

DETAILED DESCRIPTION

Although it is clearly understood that we do not wish to be limited by any postulated or theoretical mechanism for the observed beneficial results of the process of the present invention, we offer the following discussion of what is believed to be the underlying chemistry involved.

According to a preferred embodiment of the present invention a dense product is produced which contains at least 65 weight percent silicon carbide with the remainder substantially an aluminate. The aluminate also will contain scandium, yttrium, lanthanum or rare earths either singularly or as a combination of the aforementioned species (referred to as secondary sintering assist). The preferred composition range, expressed as the equivalent amount of oxide, for the product is alumina 3 to 35 weight percent and secondary sintering assist 0.01 to 10 weight percent. The alumina and the secondary sintering assist in combination preferably do not exceed 35 weight percent. In addition, the product may optionally contain silicon, aluminium or glassy phases or a combination of the said phases. The presence of alumina in the α-corundum form in the final product is typical when the aluminium to secondary sintering assist ratio in the samples is high.

Useful materials can be produced when the sintering aids are added to finely divided silicon carbide powder and the resultant mixture can be processed using traditional ceramic processing techniques to form consolidated powder compacts. The said materials are is heated using a two-stage firing cycle and densification of the body results. The materials can be conveniently densified in the temperature range of 1700° C. to 2200° C., with or without the application of pressure. It is appreciated that the application of pressure can be useful in reducing the temperature at which the densification is carried out in order to produce a dense body, but is not a prerequisite for the process.

It is believed that the additives interact to form a liquid which promotes densification by a liquid phase sintering process. The use of aluminium and the secondary sintering assist both in the form as either oxides or their precursors; or alternatively as an aluminate or a mixture of the aforementioned species, facilitates densification and the ultimate formation of an aluminate secondary grain boundary phases. Depending on the starting compositions and the firing cycle employed, the aluminate may be present in total or part as an aluminate of the secondary sintering assist.

The attainment of a suitable environment is a requirement for the successful densification of silicon carbide by the method of the present invention. It is one of the aims of the present invention to provide conditions conducive for the densification of the bodies. It is considered that the formation of suitable liquids is a requirement for the process to produce high density bodies. In this regard it is important that the active species, responsible for the densification of the body, are retained in the body until such times as the densification is completed or reaches such levels that other mechanism(s) can lead to the attainment of a high density bodies. This is common to liquid phase sintering techniques where it is a requirement that the liquid be stable.

A number of conditions must be satisfied in order to obtain useful products. These conditions relate to ensuring that the silicon carbide and the liquid phase responsible for densification,. are stable at the densification temperature. At the high temperatures required for densification, the solid and liquid phases require vapour pressures of elements, sub oxides and other vapour species to remain stable. The bodies generate their own stable atmosphere through partial decomposition of the said phases, but this decomposition should not be such that the generation of the stable atmosphere depletes the liquid phase to such an extent that densification is so retarded or inhibited that it is not possible to make dense bodies.

It is advantageous to maintain a favourable effective sample volume to furnace volume, thus limiting the amount of decomposition of the solid and liquid phases to gaseous species and ensuring an adequate level additives remain in the body to obtain a dense body. This coupled with carbon monoxide atmospheres in the second stage of the process, are successfully used to suppress the amount of decomposition of these phases without the requirement to resort to other means, such as powder beds or the introduction of active species into the hot zone from external sources. The importance of this aspect of the process will be illustrated with some of the findings of this investigation.

For the production of bodies with thicker cross sections, significant differences in fired bulk density can occur on the inside with respect to the outside of the body (coring). This can ultimately lead to cracking of the body after fabrication. It is believed this behaviour is the result of the presence of phase(s) that interfere with the densification processes by either changing the nature of the liquid phases or which decompose at the middle to is higher temperatures used. The densification of the bodies is such that it is difficult to eliminate cores from the interior of the thicker bodies. From the foregoing it can be appreciated that the critical thickness above which the formation of cores is a problem will depend on a number of factors such as heating rate, stacking geometry of samples in the furnace, effective gas flow rate, level of porosity and pore size of the body.

The use of argon for the sintering of samples results in the formation of dense bodies. However, an unwanted competing reaction is the decomposition of the silicon carbide. It is speculated that this is a consequence of the reaction of the sintering assists with the silicon carbide. This leads to the formation of silicon which condenses on the bodies with a deterioration of the surface finish. It can also lead to the condensation of silicon on the contact points of the samples with furnace furniture or other bodies making the removal or separation of the bodies extremely difficult.

It is anticipated that the generation of silicon is the result of the unwanted reaction of alumina with the silicon carbide (for example see reaction 1):

$$2SiC + Al_2O_3 \rightarrow 2Si_{(l)} + Al_2O_{(g)} + 2CO_{(g)} \qquad (1)$$

The condensation of the silicon can be avoided by the use of an atmosphere containing carbon monoxide. This leads to a greatly improved surface finish. To suppress reaction (1), at the upper end of the temperature range used for the densification, a partial pressure of carbon monoxide greater than one atmosphere is required. This temperature is estimated to be of the order of 2100° C.

It has been found that at low temperatures there are unfavourable reactions between the powder compacts and the carbon monoxide furnace atmosphere. It is anticipated that below roughly 1550° C. the following reaction is thermodynamically feasible and can proceed left to right.

$$SiC + 2CO \rightarrow SiO_2 + 3C \qquad (2)$$

Above roughly 1550° C. in one atmosphere of carbon monoxide reaction 2 goes from right to left (see reaction 3).

$$SiO_2 + 3C \rightarrow SiC + 2CO \qquad (3)$$

In addition, it is also possible that some of the silica formed by reaction 2 can react according to reaction 4.

$$SiC + SiO_2 \rightarrow 2SiO_{(g)} + C \qquad (4)$$

Further, the free carbon present can react with the aluminate phase leading to its decomposition and impairing the densification process (see reaction 5).

$$Al_2O_3 + 2C \rightarrow Al_2O_{(g)} + 2CO \qquad (5)$$

It must be appreciated, that as a raw material, the silicon carbide powder is inevitably covered by an oxide layer of silica. As silica is detrimental to the densification of bodies, it must be removed. This can be achieved by decomposition to gaseous species such as silicon monoxide (see reaction 6).

$$2SiO_2 \rightarrow 2SiO_{(g)} + O_{2(g)} \qquad (6)$$

For thinner bodies this reaction can proceed with the silica being removed by a decomposition reaction such as reaction 6. However, for thicker bodies the time required to remove this phase is appreciable. An alternative is the deliberate addition of carbon to react with the silica phase (reaction 3) to produce silicon carbide in the lower to mid temperature ranges of the firing cycle. Depending on the thickness of the components, stacking geometry and the furnace configuration the use of dwells can provide beneficial to ensure that this phase is removed. The carbon addition should be added such that it is sufficient to remove the silica phase only to prevent unwanted reactions such as reaction 5. The dwells or slow heating rates are also important to ensure that the amount of gas liberated, does not cause a pressure build up greater than the cohesive strength of the compact, leading to the formation of cracks. The use of slow heating rates is in to contrast with much of the teachings of the prior art.

Thus the presence of either or both the silica or carbon at the higher temperature at which densification occurs, react to produce an unstable phase or phases. It is believed that internal stresses are generated within the body when the internal pores are closed off from the outside atmosphere. At high temperatures these stresses are sufficient to overcome the cohesive strength of the compact, resulting in the rupture of the body. This manifests itself in the bodies after firing exhibiting macro cracks.

The use of nitrogen for the densification of bodies is not suitable as a result of unfavourable reaction of the constituents of the bodies with the atmosphere to form stable compounds. These compounds reduce the amount of liquid present at high temperatures available for densification. It is speculated that this is the result of the reaction of alumina with the silicon carbide in a nitrogen atmosphere to produce aluminium nitride. The formation of stable aluminium nitride is accompanied by a corresponding decrease in the amount of liquid phases necessary to allow densification to proceed by liquid phase sintering. A possible reaction is as follows:

$$3SiC + 2Al_2O_3 + 2N_{2(g)} \rightarrow 4AlN + 3SiO_{(g)} + 3CO_{(g)} \qquad (7)$$

This demonstrates the importance of maintaining the presence of the liquid phase at least until densification is essentially completed.

It has been found that the use of an inert atmosphere below 1550° C. and preferably at least 1600° C., but below the temperatures at which the onset of the unwanted reactions such as reaction 1 occur is beneficial for the production of useful products. Thus at the temperatures at which there are unfavourable reactions between the silicon carbide based bodies and the carbon monoxide atmosphere, the use of an inert atmosphere such as argon or possibly nitrogen can be used. Above this temperature the furnace chamber is purged and carbon monoxide is introduced into the hot zone for the remainder of the firing cycle. The temperature in the reaction zone is such that the unwanted and detrimental reactions do not take place. In addition, the unwanted formation of silicon on the body is avoided.

An alternative is to use reduced pressure in the furnace chamber below 1550° C. Thus the unwanted reactions of carbon monoxide with the compacts is avoided. Above this temperature, carbon monoxide is introduced into the reaction chamber to prevent the unwanted formation of silicon at high temperatures.

When it is the intention to produce bodies with thicker cross sections, it has been found that it is advantageous to take steps to deliberately remove the silica from the system at this phase, or the oxide-based reaction product formed from the said phase with other phases present, interferes with the uniform densification of the said bodies. For such bodies it can prove difficult to remove this phase by processes such as decomposition and diffusion. This phase as described can persist at higher temperatures. It has been found that carbon added according to equation (3) to react with the silica present on starting materials is beneficial in eliminating the presence of low density cores in the fired samples. Care has been taken to ensure that the evolution of gaseous species expected to be carbon monoxide does not lead to the cracking of the bodies. Further to this it has been found beneficial to hold the sample at a temperature at which the reaction (3) is feasible and can proceed left to right at an appreciable rate to ensure that the reaction is essentially complete before heating to a higher temperature but the rate of release does not lead to cracking of the bodies. Note, it is thought that reaction (3) should be essentially completed before heating above the equilibrium temperature for the reaction in one atmosphere of carbon monoxide. Under these conditions the generation of carbon monoxide can exceed one atmosphere and produce conditions which are conducive to cracking. Adding to much carbon according to reaction (3) for the amount of silica present leads to an observed decrease in the fired bulk density. It is believed this is as a result of the unwanted reaction of the residual carbon with oxides phases. This is in contrast to the work reported by Fuentes where the reaction of carbon with aluminium containing phases to produce oxycarbides is beneficial.

It is hypothesised that when carbon monoxide atmospheres are used exclusively, the use of extended dwells above the 1600° C. may overcome the problems associated with the use of this atmosphere at low temperatures that manifests itself in the macro cracking of the samples. It is the intention that the use of an interrupted firing cycle with a dwell above that temperature at which the carbon monoxide adversely reacts with the bodies but below the temperatures at which densification occurs leading to sealing off of the internal pores from the surface, thereby trapping volatile products in the bodies could prove advantageous. It is speculated that the use of temperature dwells above about 1550° C. say 1600° C., but below the onset of extensive densification, in particular before sealing of porosity of the bodies estimated to be around 1800°–1900° C. could prove to be effective in preventing cracking. The firing cycle would be continued after such times as the unwanted species have been removed and the sample would then be heated to the final sintering temperature to densify the powder compact into a dense useful body.

The importance of the requirement to retain the densification aids has been discussed. At the high temperatures used for the densification of the bodies, the vapour pressures of the various elements and other species can be significant. A consequence of this is to limit the unwanted reactions. In a static environment, the vapour pressure of a species will be determined by thermodynamic and kinetic considerations. At the temperatures used, the rates of the reactions are typically rapid and thus the main consideration are the thermodynamics of the reactions. The amount of material in the hot zone is an important variable. If insufficient material is fired, the amount of decomposition (reflected in the weight loss after firing) will be unacceptable and in extreme cases densification of the body will not be achieved. The decomposition is the result of the generation of the vapour species in the atmosphere. The actual partial pressure of the species can be predicted using thermodynamic calculations. The vapour pressure is thus limited to either the equilibrium partial pressure or until all the phase in question is consumed in trying to establish the equilibrium partial pressure. Depending on parameters such as the effective furnace volume and its construction, as outlined previously, it is possible to limit the amount of decomposition and generation of a stable partial pressure of volatile species without significantly changing the starting composition of the samples and adversely affecting the densification of the body. Furthermore, by incorporation of some of the gaseous reaction products, specifically carbon monoxide, into the furnace atmosphere from external sources it is possible to minimise decomposition of the samples using Le Chatelier principle.

A method of forming a dense silicon carbide product is disclosed without the use of boron, or boron containing compounds and carbon with the associated problems of uncontrolled grain growth and residual carbon degrading the physical properties or alternatively the use of powder beds, coatings, the need to introduce active densification aids into the furnace chamber via the furnace atmosphere or the requirement of rapid heating rates.

The present invention will be further illustrated by examples in a non limiting manner.

EXAMPLES 1 and 2

The raw materials used were silicon α carbide from Lonza known as grade UF10; alumina from Alcoa known as grade A16SG; yttria from Starck and dysprosia from Cerac (see table 1). The powders were weighted and ball milled using silicon carbide milling media. The starting composition are shown in table 2 and the conditions for milling are shown in table 3.

TABLE 1

Raw Materials

| Raw Material | Source | |
|---|---|---|
| α SiC | Lonza | UF10 |
| α $Al_2O_3$ | Alcoa | A16SG |
| $Y_2O_3$ | Starck | Lot P 1/87 |
| $Dy_2O_3$ | Cerac | D1016 Lot 4291 |

TABLE 2

Starting Composition (weight percent)

| | Raw Material | | | |
|---|---|---|---|---|
| Example | SiC | $Al_2O_3$ | $Y_2O_3$ | $Dy_2O_3$ |
| 1. | 88.0 | 10.0 | 2.0 | 0.0 |
| 2. | 88.0 | 10.0 | 0.0 | 2.0 |

TABLE 3

Conditions used for Ball Milling Operation

| Time | 16 hours |
|---|---|
| Powder | 300 g |
| Milling Media | 1500 g |
| Fluid | 600 ml iso-propanol |
| Binder | 2° wt % |

After milling, the milling media was separated from the slurry which was subsequently spray dried. The powder was uniaxially pressed and cold isostatically pressed at a pressure of 150 MPa into a 70 mm square tile and a 65 mm diameter disc for examples 1 and 2 respectively. The samples were then heated in air to 400° C. for 5 hours to remove the binder. Each sample was placed in a graphite work box with a loose fitting lid. The work box was then heated in a graphite resistance furnace. Each firing cycle consisted of heating the specimen initially in an atmosphere of argon. At 1600° C. the furnace was evacuated and backfilled with carbon monoxide. The details of the firing cycle are given in table 4. The specimens after firing had a smooth surface finish. The results are given in table 5.

TABLE 4

Firing Cycle

Heat to 1400° C. at 10° C. min$^{-1}$
Heat to 1600° C. at 5° C. min $^{-1}$
Hold at 1600° C. for 30 minutes
Heat to 1900° C. at 5° C. min$^{-1}$
Heat to 2000° C. at 2.5° C. min$^{-1}$
Hold at 2000° C. 60 minutes
Cool at 10° C. min$^{-1}$

TABLE 5

Example Details

| Example | 1 | 2 |
|---|---|---|
| Atmosphere | Ar/CO | Ar/CO |
| Mass (g) | 101 | 118 |
| GBD (g · cc$^{-1}$) | 1.70 | 1.71 |
| FBD (g · cc$^{-1}$) | 3.24 | 3.25 |
| Wt Change % | −5.0 | −4.3 |
| Comments | 1 | 1 |

Comments
1 = Good surface finish
GBD = Green bulk density
FBD = Fired bulk density

EXAMPLES 3 to 7

To confirm that silica and excess free carbon have an adverse effect on the densification of silicon carbide, free carbon was added to react with the silica. The same source of silicon carbide and yttria was used as for Example 1 to produce the samples. The alumina used obtained from Alcoa was known as grade A1000 and the carbon source was a phenolic resin. The powders were batched and ball milled using silicon carbide milling media (see table 6).

TABLE 6

Milling Conditions

| | |
|---|---|
| Time | 16 hours |
| Powder | 400 g |
| Balls | 2000 g SiC |
| Fluid | 800 ml iso propanol |

The samples were prepared as outlined for Example 1 with the exception that for examples 4 to 7 a phenolic resin was used as the source of free carbon. The resulting powder slurries were spray dried and green discs (65 mm diameter) were uniaxially pressed at 35 MPa and wet bag CIP at 150 MPa. The samples were heated in nitrogen to pyrolyse the resin and form free carbon (see table 7). The weight loss after pyrolysis for the phenolic resin was found to be 45.6%. The firing cycle used is given in table 8.

TABLE 7

Curing and Pyrolysis and Conditions in Nitrogen

Heat to 100° C. at 30° C. h$^{-1}$
Dwell for 1 h
Heat to 150° C. at 30° C. h$^{-1}$
Dwell for 1 h
Heat to 600° C at 50° C. h$^{-1}$
Dwell for 1 h
Cool at 200° C. h$^{-1}$

TABLE 8

Summary of Firing Cycles

Heat to 600° C. at 5° C. min$^{-1}$ in Ar gas
Heat 600° C. to 1400° C. at 10° C. min$^{-1}$
Heat 1400° C. to 1550° C. at 5° C. min$^{-1}$
Hold at 1550° C. for 30 minutes
Heat 1550° C. to 1650° C. at 5° C. min$^{-1}$
Hold at 1650° C. for 30 minutes
Evacuate to 1 mm Hg and fill CO gas
Heat 1650° C. to 1900° C. at 5° C. min$^{-1}$
Hold at 1900° C. for 60 minutes
Heat 1900° C. to 2030° C. at 2.5° C. min$^{-1}$
Hold at 2030° C. for 60 minutes
Cool to room temperature at 10° C. min$^{-1}$
until the natural cooling rates takes over.

The results of the firing are listed in table 9.

TABLE 9

Effect of free carbon content on densification using a two stage firing

| Example | 3 | 4 | 5 | 6 | 7 |
|---|---|---|---|---|---|
| SiC | 88.0 | 88.0 | 88.0 | 88.0 | 88.0 |
| Al$_2$O$_3$ | 10.0 | 10.0 | 10.0 | 10.0 | 10.0 |
| Y$_2$O$_3$ | 2.0 | 2.0 | 2.0 | 2.0 | 2.0 |
| Mass (g) | 249 | 251 | 251 | 254 | 261 |
| GBD (g · cc$^{-1}$) | 1.68 | 1.72 | 1.73 | 1.71 | 1.73 |
| Carbon content (calc) | 0 | 0.5 | 1.0 | 2.0 | 3.0 |
| FBD (g · cc$^{-1}$) | 3.20 | 3.25 | 3.25 | 3.18 | 3.09 |
| Wt Change % | −4.6 | −3.4 | −4.1 | −3.9 | −4.6 |

From the results in table 9, it can be seen that the addition of small amounts of carbon enhances the level of fired bulk density obtained (Examples 4 and 5). For higher levels of carbon addition, there is a decrease in fired bulk density (Examples 6 and 7). It is believed that this behaviour is the result of the unfavourable reaction of the carbon at high temperatures. Thus there exists an optimum range for the carbon content. It is important to note that for thinner samples the addition of carbon was not found to be necessary in order to produce high bulk density fired products. It is believed that for these samples the silica layer is able to decompose and can be removed from the powder compact. In thick samples, this becomes more difficult as it requires considerable time to decompose and remove the unwanted oxide in the powder compact. Thus the removal of the said unwanted phase is required to produce dense uniform thicker samples.

COMPARATIVE EXAMPLE 8

The effect of firing cycle on cracking and the formation of lower fired bulk density cores was investigated. The composition was the same as example 1 and the sample preparation was the same as example 2. The firing cycle used is shown in table 10.

TABLE 10

Firing cycle

Heat to 600° C. at 5° C. min$^{-1}$ in Ar gas
Heat 600° C. to 1400° C. at 10° C. min$^{-1}$
Heat 1400° C. to 1650° C. at 5° C. min$^{-1}$
Hold at 1650° C. for 30 minutes
Evacuate to 1 mm Hg and fill CO gas
Heat 1650° C. to 1900° C. at 5° C. min$^{-1}$ TABLE 10-continued Firing cycle Heat 1900° C. to 2030° C. at 2.5° C. min$^{-1}$
Hold at temp for 60 minutes
Cool to room temperature at 10° C. min$^{-1}$
until the natural cooling rate takes over.

The results of the firing are listed in table 11.

TABLE 11

Effect of the firing cycle on cracking

| Example | 8 |
|---|---|
| SiC | 88.0 |
| Al$_2$O$_3$ | 10.0 |
| Y$_2$O$_3$ | 2.0 |
| Mass (g) | 249 |
| GBD (g · cc$^{-1}$) | 1.68 |
| FBD (g · cc$^{-1}$) | 3.22 |
| Wt Change % | −5.0 |
| Comments | Shattered |

The results show that larger samples (example 8) are subject to high stresses during the firing cycle. These stresses can become large enough to overcome the cohesive strength of the samples leading to its failure. Comparison of examples 8 and 3 show that for larger samples the elimination of intermediate holds for these specimens leads to cracking. Comparison with Example 1, shows that lower sample masses do not require holds, however, the use of larger sample masses has an adverse effect on the densification of samples. Similar effects could also be observed with increased furnace charges even if the component mass were small. It is believed that the presence of the silica impurities, in the form of silica, a silicate or related phase has an adverse effect on the densification behaviour of bodies. For smaller sample masses, it is possible to reduce the effects of this phase as a result of volatilisation without resorting to techniques such as intermediate temperature dwells. However, as the sample size is increased the density is impaired even with a controlled heating.

EXAMPLES 9 TO 12

The effect of composition was also investigated. The same sources of silicon carbide, alumina, yttria and phenolic resin as used for example 3 were used to produce the examples 9 to 11. For example 12, the same sources of silicon carbide, alumina and phenolic resin were used together with ceria from Cerac. The sample preparation was the same as example 3. All the samples were fired together in the one work box. The firing cycle used is given in table 12.

TABLE 12

Firing cycles

Heat to 600° C at 5° C. min$^{-1}$ in Ar gas
Heat 600° C. to 1400° C. at 10° C. min$^{-1}$
Heat 1400° C. to 1550° C. at 5° C. min$^{-1}$
Hold at 1550° C. for 30 minutes
Heat 1550° C. to 1650° C. at 5° C. min$^{-1}$
Hold at 1650° C. for 30 minutes
Evacuate to 1 mm Hg and fill CO gas
Heat 1650° C. to 1900° C. at 5° C. min$^{-1}$
Hold at 1900° C. for 90 minutes TABLE 12-continued Firing cycles Heat 1900° C. to 2030° C. at 2.5° C. min$^{-1}$
Hold at 2030° C. for 60 minutes
Cool to room temperature at 10° C. min$^{-1}$
until the natural cooling rate takes over.

The results of the firing cycle are listed in table 13.

TABLE 13

Effect of composition densification using a two stage firing

| Example | 9 | 10 | 11 | 12 |
|---|---|---|---|---|
| SiC | 93.0 | 79.0 | 63.0 | 88.0 |
| Al$_2$O$_3$ | 5.0 | 20.0 | 35.00 | 10.0 |
| Y$_2$O$_3$ | 2.0 | 1.0 | 2.0 | 0 |
| CeO$_2$ | 0 | 0 | 0 | 2.0 |
| Mass (g) | 250 | 248 | 248 | 250 |
| GBD (g · cc$^{-1}$) | 1.67 | 1.74 | 1.82 | 1.72 |
| Carbon content (calc) | 0.6 | 0.9 | 0.7 | 1.0 |
| FBD (G · CC$^{-1}$) | 3.19 | 3.31 | 3.26 | 3.19 |
| WT Change % | −2.2 | −4.9 | −5.6 | −3.7 |

From the results it can be seen that a wide range of alumina contents can be used to produce high density samples. At the lower and upper limits of alumina addition, the fired bulk density decreases.

It will be clearly understood that the invention in its general aspects is not limited to the specific details given hereinbefore.

We claim:

1. A process for the production of a dense polycrystalline silicon carbide shaped article, characterized in that the process includes the following steps:
    (a)(i) forming a powder compact containing silicon carbide, a secondary sintering assist and alumina or a precursor of alumina but excluding boron or boron containing compounds;
    (a)(ii) heating the powder compact containing a secondary sintering assist, in an inert atmosphere, to a temperature ranging between 1400° and 1650° C.;
    (b) maintaining the powder compact in the temperature range between 1400° and 1650° C. in an inert atmosphere for at least 30 minutes and thereafter for a time sufficient to remove unstable species which adversely affect the densification of the compact; and
    (c) heating the product of step (b) to a temperature above 1900° C. in an atmosphere comprising carbon monoxide for at least 60 minutes, and thereafter for a time sufficient to produce a dense polycrystalline silicon carbide product
wherein the secondary sintering assist comprises at least one of scandium or an oxide thereof, yttrium or an oxide thereof, rare earths, zirconium or an oxide thereof, hafnium or an oxide thereof, thorium or an oxide thereof.

2. A process according to claim 1 wherein silica is an unstable species removed in step (b).

3. A process according to claim 1 wherein the temperature is maintained at between 1400° and 1650° C. in an inert atmosphere.

4. A process according to claim 1 in which the sintering assist comprises at least one rare earth.

5. A process according to claim 4 in which the secondary sintering assist comprises yttria.

6. A process according to claim 4 in which the sintering assist comprises dysprosia.

7. A process according to claim 1 in which the inert atmosphere comprises argon.

8. A process according to claim 1 wherein silicate is an unstable species removed in step (b).

9. A process according to claim 2 or claim 8 in which silica or silicate is eliminated by reaction with carbon.

10. A process according to claim 1 in which step (c) is carried out at between 1900° and 2200° C.

11. A process according to claim 1 carried out at ambient pressure.

12. A process for the production of a dense polycrystalline silicon carbide shaped article, characterized in that the process includes the following steps:
- (a)(i) forming a powder compact containing silicon carbide, alumina or a precursor of alumina and a sintering assist;
- (a)(ii) heating the powder compact, in an inert atmosphere, to a temperature ranging between 1600° and 1900° C.;
- (b) maintaining the powder compact in the temperature range between 1600° and 1900° C. in an atmosphere comprising carbon monoxide, the powder compact being maintained in the temperature range for at least 30 minutes and thereafter for a time sufficient to remove unstable species which adversely affect the densification of the compact; and
- (c) heating the product of step (b) to a temperature above 1900° C. in an atmosphere comprising carbon monoxide for at least 60 minutes, and thereafter for a time sufficient to produce a dense polycrystalline silicon carbide product wherein the sintering assist comprises at least one of scandium or an oxide thereof, yttrium or an oxide thereof, rare earths, zirconium or an oxide thereof, hafnium or an oxide thereof, thorium or an oxide thereof.

13. A process according to claim 12 wherein silica is an unstable species removed in step (b).

14. A process according to claim 12 in which the sintering assist comprises at least one rare earth.

15. A process according to claim 14 in which the sintering assist comprises yttria.

16. A process according to claim 14 in which the sintering assist comprises dysprosia.

17. A process according to claim 12 wherein silicate is an unstable species removed in step (b).

18. A process according to claim 12 in which step (c) is carried out at between 1900° and 2200° C.

19. A process according to claim 13 or claim 18 in which silica or silicate is eliminated by reaction with carbon.

20. A process according to claim 12 carried out at ambient pressure.

21. A process for the production of a dense polycrystalline silicon carbide shaped article, characterized in that the process includes the following steps:
- (a)(i) forming a powder compact containing silicon carbide, alumina or a precursor of alumina and a sintering assist;
- (a)(ii) heating the powder compact to a temperature between 1400° and 1650° C.;
- (b) maintaining the powder compact in the temperature range between 1400° and 1650° C. in a vacuum, the powder compact being maintained in the temperature range for at least 30 minutes and thereafter for a time sufficient to remove unstable species which adversely affect the densification of the compact; and
- (c) heating the product of step (b) to a temperature above 1900° C. in an atmosphere comprising carbon monoxide for at least 60 minutes, and thereafter for a time sufficient to produce a dense polycrystalline silicon carbide product wherein the sintering assist comprises at least one of scandium or an oxide thereof, yttrium or an oxide thereof, rare earths, zirconium or an oxide thereof, hafnium or an oxide thereof, thorium or an oxide thereof.

22. A process according to claim 21 wherein silica is an unstable species removed in step (b).

23. A process according to claim 21 in which the sintering assist comprises at least one rare earth.

24. A process according to claim 23 in which the sintering assist comprises yttria.

25. A process according to claim 23 in which the sintering assist comprises dysprosia.

26. A process according to claim 21 wherein silicate is an unstable species removed in step (b).

27. A process according to claim 22 or claim 26 in which silica or silicate is eliminated by reaction with carbon.

28. A process according to claim 21 in which step (c) is carried but at between 1900° and 2200° C.

29. A process according to claim 21 carried out at ambient pressure.

* * * * *